June 22, 1937.  J. S. IRVING  2,084,972
BRAKE
Filed Dec. 31, 1936
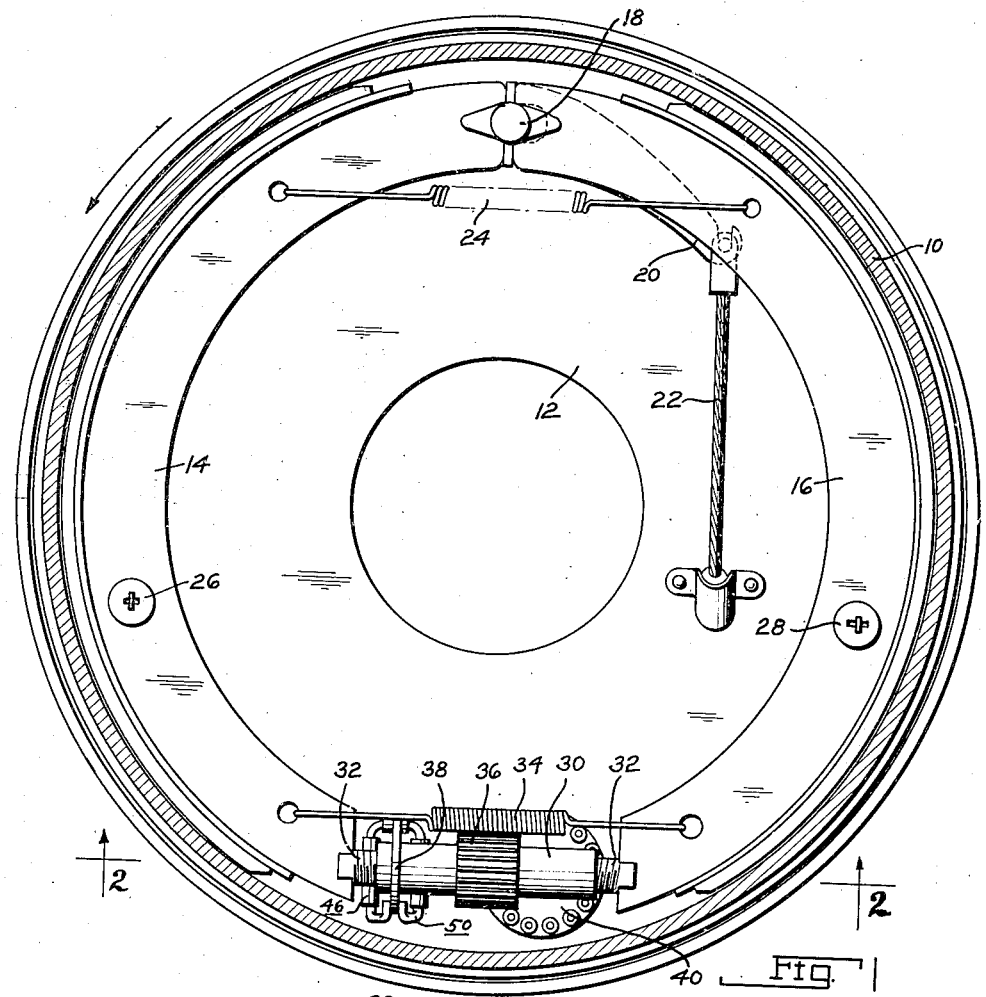
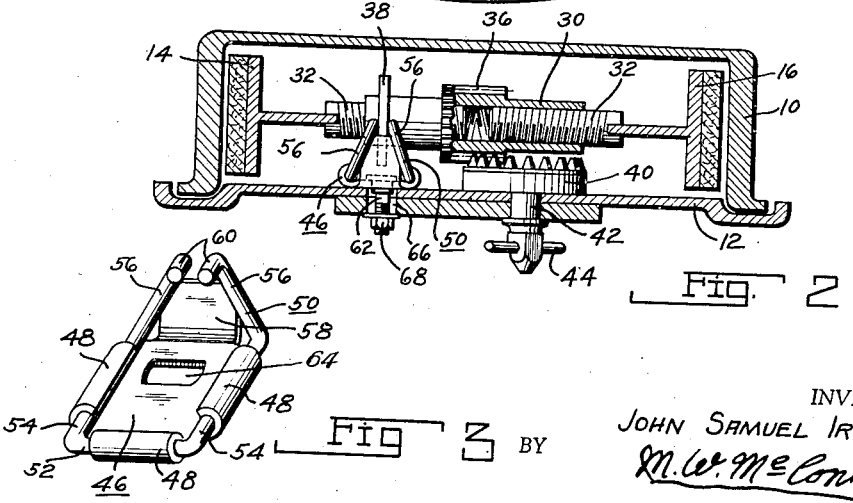
INVENTOR.
JOHN SAMUEL IRVING
M. W. McConkey
ATTORNEY.

Patented June 22, 1937

2,084,972

UNITED STATES PATENT OFFICE 2,084,972

BRAKE

John Samuel Irving, Birmingham, England, assignor to Bendix Products Corporation, South Bend, Ind., a corporation of Indiana Application December 31, 1936, Serial No. 118,660
In Great Britain December 23, 1935

7 Claims. (Cl. 188—79.5)

This invention relates to brakes, and more particularly to adjusting devices therefor.

An object of the invention is to provide improvements in adjusting and centering devices for a shiftable-anchorage type brake.

Another object is to provide a centering device for a shiftable-anchorage type brake acting in conjunction with the adjusting means for the shoes.

I prefer to accomplish the above objects by providing a brake with a pair of generally semicircular shoes having anchorage and applying means between one pair of adjacent ends, and having a floating expansible thrust member between the other pair of adjacent ends.

The expansible thrust member preferably comprises an internally, oppositely-threaded sleeve, threadedly receiving a pair of shoe engaging plungers, the sleeve being formed at its center with wide-faced gear teeth engaging a crown wheel journalled in the backing plate and rotatable from outside the brake, and at one of its ends with a flange.

My novel centering device comprises a solid spring steel wire formed in a U-shape and secured in a stamping adjustably fastened on the backing plate, and having the ends of the U bent up from the backing plate to engage opposite sides of the flange and yieldingly hold it in any predetermined position.

Other objects and desirable particular constructions will be apparent by reference to the following detailed description of one illustrative embodiment of the invention in the accompanying drawing, in which:

Figure 1 is a section taken just inside the head of the drum of a brake embodying my invention, showing the shoes in side elevation;

Figure 2 is a section with parts in elevation, taken on the line 2—2 of Figure 1, showing in detail the novel adjusting and centering devices; and Figure 3 is a perspective view of the centering device.

The illustrated brake comprises a rotatable drum 10, having its open end enclosed by a fixed backing plate 12, on which is mounted a pair of generally semi-circular shoes 14 and 16.

One pair of adjacent shoe ends is notched to engage a cylindrical anchor post 18 secured to the backing plate, and the same pair of shoe ends is acted upon by a floating applying lever 20 having an actuating cable 22 extending out through the backing plate. The anchor is preferably adjustable radially of the brake in the usual manner, but this is not shown in the drawing.

A return spring 24 serves to return and hold the shoes in released position against the anchor, and the usual steady rests 26 and 28 are provided to hold the shoes yieldingly against the backing plate.

The opposite ends of the shoes are interconnected by my novel adjusting device in the form of an expansible thrust member comprising an internally, oppositely-threaded sleeve 30 having, threaded in each end a plunger 32 engaging one of the shoe ends. A spring 34 holds the shoe ends against the plunger 32 and causes them to floatingly support the adjusting device.

The sleeve 30 is formed at its center with wide faced gear teeth 36 constituting in effect a pinion integral and concentric therewith, and is formed near one of its ends with a radial flange 38.

A crown wheel 40, having a stub shaft 42, is mounted parallel to the backing plate in engagement with the gear teeth 36, the stub shaft 42 being journaled in and projecting through the backing plate 12 and being provided, outside the backing plate, with a handle 44 for manual rotation of the crown wheel. The teeth of the crown wheel are conical in form, thus permitting it to engage the teeth 36 of the sleeve 30 at any point along their length. This desirable feature permits the sleeve 30 to shift as the brakes are applied.

My novel centering device comprises a stamping 46 having a generally rectangular body portion provided with three tongues 48 projecting from three sides thereof. These tongues are formed parti-cylindrically to embrace a U-shaped solid steel wire spring 50. The bottom of the U 52 is held tightly by one of the tongues 48 and the sides 54 are rotatably held by the other two tongues. Beyond the embrace of the tongues the sides 54 of the spring are bent up generally at right angles, but in planes inclined toward each other, to form two arms 56. A fourth tongue 58 is bent at right angles to the body of the stamping 48 and extends between the arms 56 to hold them spaced a distance equal to the width of the flange 38 plus a small clearance to permit the flange to rotate more or less freely. The ends of the arms are bent over as at 60 to provide an enlarged bearing surface.

The stamping 46 is secured to the backing plate 12, so that the arms 56 engage opposite sides of the flange 38, by means of a bolt 62 having a squared end passing through a correspondingly shaped opening 64 in the stamping and a slot 66

66 in the backing plate. This bolt is provided with a nut 68 outside the backing plate. This construction prevents rotating of the centering device about the bolt as an axis, but permits it to be adjusted parallel to the axis of the sleeve 30.

To adjust a brake employing my novel devices, the anchor post (which, as before stated, is radially adjustable) and the centering device nut 68 are loosened, and by rotating the handle 44 on the crown wheel, the shoes are expanded tightly against the drum. This automatically shifts the anchor and centering device to their proper positions in which they are secured. The crown wheel is then rotated in the opposite direction to withdraw the shoes from the drum and give them the proper operating clearance. Subsequent adjustments, as the brake lining wears, may be made merely by expanding the shoes by rotation of the crown wheel.

With the brake properly adjusted, its operation is as follows. Tension applied to the cable 22 rotates the floating cam 24 and expands the anchored shoe ends away from the anchor against the drum. The shoes then rotate with the drum until one of the shoe ends returns to the anchor (which one depending upon which direction the drum is rotating). Assuming that the drum is rotating in the direction of the arrow, shoe 16 will anchor and shoe 18 will transfer its braking force through the adjuster 30—32 to shoe 16. This causes a translatory movement of the adjuster to the right and swings the right hand arm 60 (Figure 1) of the centering device to the right.

Release of tension on the cable permits spring 24 to withdraw the shoes back to the anchor and arm 60, being acted upon by the side 54 of the spring 50 as a torsion spring swings back against the tongue 58 centering the shoes.

While only one illustrative embodiment of my invention has been described in detail, it is not my intention to be limited by that embodiment or otherwise than by the terms of the appended claims.

What is claimed is:

1. In a brake, floating friction means, a support for the friction means, a stamping secured to the support, a U-shaped solid wire spring having portions of the sides of the U supported in said stamping and having other portions bent up to form arms engaging the friction means, and means integral with the stamping for holding the arms apart in predetermined spaced relationship.

2. In a brake having a drum, a pair of generally semi-circular floating shoes, a support for said shoes and anchorage and applying means at one pair of adjacent shoe ends, an expansible thrust member between the other pair of shoe ends comprising an internally oppositely-threaded sleeve formed at its center with wide-faced gear teeth and at one end with a radial flange and shoe-engaging thrust members threaded into opposite ends of the sleeve, a crown wheel engaging said gear teeth and having a shaft journaled in and projecting through said support and having means outside the brake for manually rotating the crown wheel, and a centering device comprising a U-shaped solid wire spring secured to the support and having its ends bent up to form arms engaging opposite sides of said flange.

3. In a brake having a pair of generally semi-circular shoes, and a support therefor, an expansible thrust member between one pair of adjacent ends, an operating pinion at the center of said member, a radial flange near one end of said member, a crown wheel pivoted in the support and operatively engaging said pinion, and a solid wire spring secured to the support and having its ends bent up to form arms engaging opposite sides of said flange.

4. In a brake having a pair of generally semi-circular shoes, and a support therefor, an expansible thrust member between one pair of adjacent ends, an operating pinion at the center of said member, a radial flange near one end of said member, a crown wheel pivoted in the support and operatively engaging said pinion, a U-shaped solid wire spring having the end portions of the sides of the U bent up to form arms engaging opposite sides of said flange, and means secured to said support engaging the remaining portions of the sides of the U so that they act as torsion springs.

5. In a brake having a pair of generally semi-circular shoes and a support therefor, an expansible thrust member between one pair of adjacent ends, an operating pinion at the center of said member, a radial flange near one end of said member, a crown wheel pivoted in the support and operatively engaging said pinion, a U-shaped solid wire spring having the end portions of the sides of the U bent up to form arms engaging opposite sides of said flange, and means secured to said support engaging the remaining portions of the sides of the U so that they act as torsion springs, said last named means comprising a stamping having tongues formed parti-cylindrically to receive said portions.

6. In a brake having a pair of generally semi-circular shoes, and a support therefor, an expansible thrust member between one pair of adjacent ends, an operating pinion at the center of said member, a radial flange near one end of said member, a crown wheel pivoted in the support and operatively engaging said pinion, a stamping secured to the support, and a U-shaped solid wire spring having portions of the sides of the U embraced by said stamping and having other portions bent generally at right angles to said first portions to form arms engaging opposite sides of said flange.

7. In a brake having a pair of generally semi-circular shoes, and a support therefor, an expansible thrust member between one pair of adjacent ends, an operating pinion at the center of said member, a radial flange near one end of said member, a crown wheel pivoted in the support and operatively engaging said pinion, a stamping secured to the support, a U-shaped solid wire spring having portions of the sides of the U embraced by said stamping and having other portions bent generally at right angles to said first portion to form arms engaging opposite sides of said flange, and means integral with the stamping extending between said arms to hold them apart in predetermined spaced relationship.

JOHN SAMUEL IRVING.